June 23, 1953 — J. ROBINSON — 2,642,810
POWER TRANSMISSION
Filed May 10, 1947
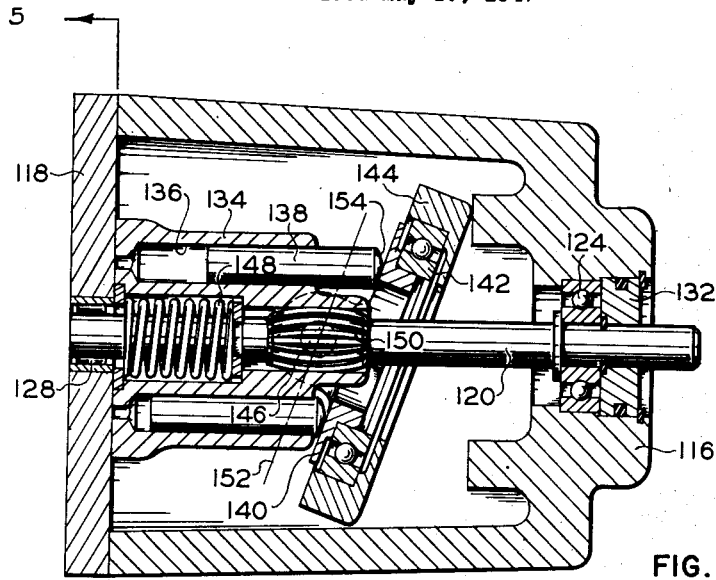
FIG. 1
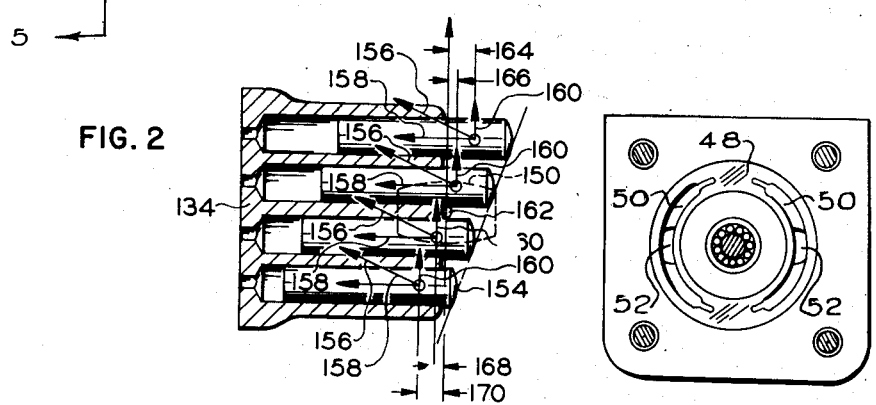
FIG. 2
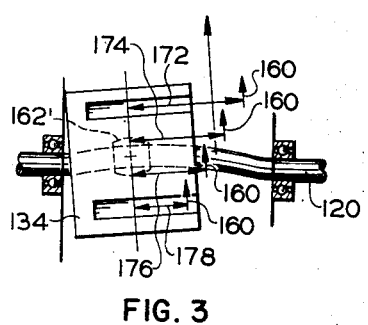
FIG. 3
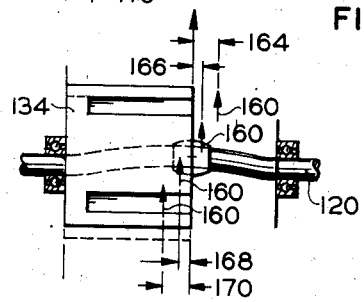
FIG. 4
FIG. 5
*INVENTOR.*
JAMES ROBINSON
BY 
ATTORNEY Patented June 23, 1953

2,642,810

UNITED STATES PATENT OFFICE 2,642,810

POWER TRANSMISSION

James Robinson, Huntington Woods, Mich., assignor to Vickers Incorporated, Detroit, Mich., a corporation of Michigan Application May 10, 1947, Serial No. 747,215

4 Claims. (Cl. 103—162)

This invention relates to power transmissions, particularly to those of the type comprising two or more fluid pressure energy translating devices, one of which may function as a pump and another as a fluid motor.

The invention is more particularly concerned with a power transmission system incorporating a fluid pump and motor construction of the type having a rotary cylinder barrel abutting a stationary valve plate and provided with axial cylinders and pistons reciprocable therein which abut against a rotating thrust plate, the axis of which is inclined to the axis of rotation of the cylinder barrel. It is particularly concerned with that class of devices wherein the pistons abut directly against the inclined thrust plate without the use of articulated connecting rods so that the driving torque is transmitted through the pistons acting as cantilevers by reason of that component of piston thrust against the inclined thrust plate which is normal to the shaft axis.

In such devices this normal thrust component or side thrust on the pistons not only creates the driving torque but also creates a considerable lateral force on the cylinder barrel tending to displace it from normal position. If the cylinder barrel is not maintained flatly against the valve plate, it will frequently lift off completely due to fluid flow conditions set up when it starts to lift slightly. This, of course, renders the whole device inoperative, and may be very hazardous where the device is connected to operate certain types of loads.

In prior art devices of this class it has been found necessary to provide extremely rigid support for the cylinder barrel against lateral displacement and to utilize very heavy shafts, bearings and other parts in order to successfully resist the side forces on the cylinder barrel when the unit is operated at high pressures. Such constructions require a high degree of accuracy in their manufacture since by attempting to positively hold the cylinder barrel in position against these forces, its position must be fixed accurately, particularly in relation to the valve plate surface. Any misalignment due to accumulated tolerances in the manufacture of the device becomes permanently built into the device, so to speak. This approach to the problem had led to high production costs largely due to the strength and accuracy which must be maintained in all of the parts.

It is an object of the present invention to provide a construction to meet this problem less expensively and to provide a device which may be produced without close tolerances and with lighter parts which may deflect under load without interfering with the operation of the device.

More specifically, it is an object of the invention to provide a device of the class described wherein the cylinder barrel is so mounted that it may float to seek its own position of flat contact against the valve independently of shaft deflection or shaft misalignment with the valve plate surface.

It is a further object to provide such a device wherein the shaft alone locates the cylinder barrel against radial displacement and the locating contact is so positioned along the axis of the shaft as to eliminate all tilting moments produced by the side thrust applied to the cantilever pistons.

These and other objects are accomplished by a construction wherein the cylinder block and the shaft contact each other for radial locating purposes in a zone, the center of which lies on the shaft axis at the intersection therewith of a plane passing through the centers of thrust of all of the pistons. This locating contact zone is, furthermore, of such character that the cylinder barrel has a universal movement with respect to the shaft so that there may be a small amount of angular misalignment between the cylinder barrel axis and the shaft axis. By this construction the cylinder barrel is free to take up a position with its axis exactly perpendicular to the valve plate surface even though the shaft be out of line therewith or be deflected due to load. By positioning this locating zone at the point specified, the side thrust forces acting on the cantilever pistons are all balanced so far as producing any tilting couple on the cylinder barrel is concerned.

Further objects and advantages of the present invention will be apparent from the following description, reference being had to the accompanying drawings wherein a preferred form of the present invention is clearly shown.

In the drawings:

Figure 1 is a longitudinal cross-section of a fluid pressure energy translating device incorporating one form of the present invention.

Figure 2 is a diagram of the cylinder barrel and the pistons showing the operating forces applied thereto.

Figure 3 is a diagram showing in exaggerated form the effect of tilting couples on the cylinder block in a device not using the present invention.

Figure 4 is a diagram corresponding to Figure 3 showing the action of the present invention under load.

Figure 5 is a transverse section on line 5—5 of Figure 1 showing the inlet and outlet passages.

In Figure 1 there is illustrated a variable displacement fluid pressure energy translating device having a housing 116, the left-hand end of which is closed by a valve plate 118. The valve plate has inlet and outlet ports 50 and connections 52 formed in a sealing surface 48. A shaft 120 is journaled on bearings 124 and 128 and sealed to the housing by a shaft seal 132. A cylinder barrel 134 is provided with cylinder bores 136 and reciprocating cantilever pistons 138. The latter abut against a rotating inclined thrust plate 140 journaled on bearing 142 in a tilting box 144, pivoted to the casing by pintles 146. A suitable spring 148 abuts against a shoulder on the shaft at its right-hand end and against a retaining washer on the cylinder barrel at its left-hand end to yieldingly urge the cylinder barrel 134 against the valve plate 118. The cylinder barrel is drivingly connected with the shaft 120 by means of a splined connection at 150. The male and female parts of the spline are loosely fitted so that it serves as a universal joint and as a radial locating means for the cylinder barrel 134. There is thus provided a contact zone, the center of which lies at the intersection of the shaft axis with a plane (indicated at 152) which passes through the imaginary centers of the spherical surfaces 154 at the right-hand end of each piston 138.

In order to explain the action of the device more clearly, reference may be had to Figure 2 which is a diagram showing four pistons and the cylinder block with the forces acting thereon. Regardless of whether the unit be operating as a pump or as a fluid motor, the thrust plate 140 produces on each piston a thrust force designated 156 in each case which acts perpendicularly to the thrust plate through the center of the spherical surfaces 154. This may be resolved into two components 158 and 160, the former being equal to the longitudinal thrust created by the fluid pressure in the cylinder bore and the latter being the side thrust on each piston which produces torque in the case of a motor or is produced by the driving torque in the case of a pump. If the cylinder barrel is constrained against upward movement by the spline 150 and yet is unrestrained against angular movement about the center thereof at 162, it will be seen that a summation of all the moments about center 162 caused by the side thrust forces 160 will be zero. The two side thrusts acting on the two upper pistons act through lever arms designated 164 and 166 to produce counterclockwise moments about the center 162 while the corresponding forces on the two lower pistons acting through lever arms 168 and 170 produce equal and opposite clockwise moments about this point. Thus the cylinder barrel 134 may be urged into contact with the valve plate 118 by the spring 148 and will seat itself flatly thereon with its axis exactly perpendicular thereto and passing through the point 162 irrespective of the load.

As an example of what would happen if the point 162 were not located in the plane of the thrust centers of the individual pistons, reference may be had to Figure 3 wherein the locating means is centered at a point 162' which is somewhat to the left of the plane in question. Thus the thrust forces 160 act through lever arms 172 through 178, inclusive, all of which produce counterclockwise moments which are cumulative and tend to tilt the cylinder barrel counterclockwise. It will be understood that the thrust forces 160 all add up as forces to produce a side thrust on the cylinder barrel and on the shaft 120 which tend to deflect it as shown in exaggerated form in Figure 3. When such deflection occurs, the tilting couples come into play and lift the cylinder barrel off from the valve plate. When this occurs while the pump is operating at high speed and with substantial displacement, the normal flow through the porting in the cylinder barrel escapes between the cylinder barrel and valve plate, bypassing the intended output, and further lifts the cylinder barrel clear of the valve plate.

In distinction to this, the action of the present device is illustrated in Figure 4 from which it will be seen that the side thrusts are permitted to deflect the shaft upwardly. However, this results merely in the movement of the cylinder barrel from the dotted line position to the solid line position shown and it can still float with its axis maintained perpendicular to the valve plate since there are no tilting moments to disturb it.

It will thus be seen that the present invention provides an entirely different approach to the problem outlined and instead of attempting to hold the cylinder barrel in position by brute force, permits it to float and to align its axis perpendicularly to the valve plate independently of shaft deflection or even of original shaft misalignment. Thus the shaft may be made somewhat lighter and the tolerances required on all of the parts may be considerably wider than with previous constructions. This is brought about by the provision of a locating zone to locate the cylinder barrel from the shaft, with freedom to pivot about a point in the plane of the thrust centers acting on all of the pistons. It will be understood that the angular movement which is necessary between the cylinder barrel and shaft is very small in any event, being merely sufficient to provide for the maximum expected shaft deflection and shaft misalignment.

This application is a continuation in part of James Robinson application Serial No. 630,918 filed November 26, 1945, entitled Power Transmission, now abandoned.

While the form of embodiment of the invention as herein disclosed constitutes a preferred form, it is to be understood that other forms might be adopted, all coming within the scope of the claims which follow.

What is claimed is as follows:

1. A fluid pressure energy translating device comprising in combination a drive shaft, a housing journalling the drive shaft and having a stationary flat valve plate provided with inlet and outlet ports, a rotatable cylinder barrel in abutment with the valve plate and in driving relation to the drive shaft and having a plurality of axial cylinder bores, pistons reciprocable in the bores and having a spherical surface at one end of each piston, an inclined thrust plate mounted in the housing in driving relation with the pistons at their spherical ends and creating forces on the barrel perpendicular to the thrust plate at each bore the lateral components of which are transmitted as side thrust on the cylinder barrel, said valve plate having only flat surface contact with the barrel whereby to locate the barrel as to endwise motion and as to the direction of the barrel axis but leaving the barrel unconstrained as to lateral motion, and means having a universal and axially slidable contact with the barrel for locating the barrel as to lateral motion but imposing no constraint on the barrel as to endwise motion and as to the direction of its axis, the last means being located to have its universal movement about the point on the shaft axis which intersects the plane containing the centers of said spherical surfaces.

2. A fluid pressure energy translating device comprising in combination a drive shaft, a housing journalling the drive shaft and having a stationary flat valve plate provided with inlet and outlet ports, a rotatable cylinder barrel in abutment with the valve plate and in driving relation to the drive shaft and having a plurality of axial cylinder bores, pistons reciprocable in the bores and having a spherical surface at one end of each piston, an inclined thrust plate mounted in the housing in driving relation with the pistons at their spherical ends and creating forces on the barrel perpendicular to the thrust plate at each bore the lateral components of which are transmitted as side thrust on the cylinder barrel, said valve plate having only flat surface contact with the barrel whereby to locate the barrel as to endwise motion and as to the direction of the barrel axis but leaving the barrel unconstrained as to lateral motion, and means on the shaft having a universal and axially slidable contact with the barrel for locating the barrel as to lateral motion but imposing no constraint on the barrel as to endwise motion and as to the direction of its axis, the last means being located to have its universal movement about the point on the shaft axis which intersects the plane containing the centers of said spherical surfaces.

3. A fluid pressure energy translating device comprising in combination a drive shaft, a housing journalling the drive shaft and having a stationary flat valve plate provided with inlet and outlet ports, a rotatable cylinder barrel in abutment with the valve plate and in driving relation to the drive shaft and having a plurality of axial cylinder bores, pistons reciprocable in the bores, an inclined thrust plate mounted in the housing, means on each piston providing a driving engagement between the piston and the thrust plate which is perpendicular to the thrust plate, said means acting to transmit forces to the pistons which are perpendicular to the thrust plate at each bore the lateral components of which forces are transmitted as side thrust on the cylinder barrel, said valve plate having only flat surface contact with the barrel whereby to locate the barrel as to endwise motion and as to the direction of the barrel axis but leaving the barrel unconstrained as to lateral motion, and means supported by the housing and having a universal and axially slidable contact with the barrel for locating the barrel as to lateral motion but imposing no constraint on the barrel as to endwise motion and as to the direction of its axis, said last means being located to have its universal action about a point on the shaft axis where the summation of moments, resulting from said lateral components, is zero.

4. A fluid pressure energy translating device comprising in combination a drive shaft, a housing journalling the drive shaft and having a stationary flat valve plate provided with inlet and outlet ports, a rotatable cylinder barrel in abutment with the valve plate and in driving relation to the drive shaft and having a plurality of axial cylinder bores, pistons reciprocable in the bores, an inclined thrust plate mounted in the housing, means on each piston providing a driving engagement between the piston and the thrust plate which is perpendicular to the thrust plate, said means acting to transmit forces to the pistons which are perpendicular to the thrust plate at each bore the lateral components of which forces are transmitted as side thrust on the cylinder barrel, said valve plate having only flat surface contact with the barrel whereby to locate the barrel as to endwise motion and as to the direction of the barrel axis but leaving the barrel unconstrained as to lateral motion, and means on the shaft having a universal and axially slidable contact with the barrel for locating the barrel as to lateral motion but imposing no constraint on the barrel as to endwise motion and as to the direction of its axis, said last means being located to have its universal action about a point on the shaft axis where the summation of moments, resulting from said lateral components, is zero.

JAMES ROBINSON.

References Cited in the file of this patent

UNITED STATES PATENTS

| Number | Name | Date |
|---|---|---|
| 1,539,616 | Williams | May 26, 1925 |
| 1,840,866 | Rayburn et al. | Jan. 12, 1932 |
| 1,867,308 | Durner | July 12, 1932 |
| 2,146,117 | Gros | Feb. 7, 1939 |
| 2,161,143 | Doe et al. | June 6, 1939 |
| 2,206,305 | Rose et al. | July 3, 1940 |
| 2,300,009 | Rose | Oct. 27, 1942 |
| 2,307,041 | Hawley | Jan. 5, 1943 |
| 2,455,330 | Denison | Nov. 30, 1948 |
| 2,480,069 | Wright | Aug. 23, 1949 |